(12) United States Patent
Taguchi

(10) Patent No.: US 9,866,107 B2
(45) Date of Patent: Jan. 9, 2018

(54) CONTROL SYSTEM FOR INVERTER

(71) Applicant: TOYOTA JIDOSHA KABUSHIKI KAISHA, Toyota-shi, Aichi-ken (JP)

(72) Inventor: Etsushi Taguchi, Seto (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 63 days.

(21) Appl. No.: 15/047,107

(22) Filed: Feb. 18, 2016

(65) Prior Publication Data

US 2016/0248317 A1    Aug. 25, 2016

(30) Foreign Application Priority Data

Feb. 24, 2015  (JP) ................... 2015-034074

(51) Int. Cl.
*H02H 7/08*  (2006.01)
*H02M 1/32*  (2007.01)
(Continued)

(52) U.S. Cl.
CPC ............... *H02M 1/32* (2013.01); *B60L 3/003* (2013.01); *B60L 3/0069* (2013.01); *B60L 3/04* (2013.01); *B60L 11/1803* (2013.01); *B60L 11/1864* (2013.01); *B60L 15/007* (2013.01); *H02M 3/156* (2013.01); *H02M 7/44* (2013.01); *H02M 7/5387* (2013.01); *H02P 29/024* (2013.01); *H02P 29/0241* (2016.02); *H02P 29/032* (2016.02); *B60L 2220/14* (2013.01); *B60L 2240/12* (2013.01); *B60L 2240/421* (2013.01); *B60L 2240/423* (2013.01); *B60L 2240/547* (2013.01); *B60L 2240/549* (2013.01); *B60L 2250/24* (2013.01); *B60L 2250/26* (2013.01); *H02M 2001/007* (2013.01); *H02M 2001/0051* (2013.01); *Y02T 10/645* (2013.01); *Y02T 10/7005* (2013.01); *Y02T 10/7061* (2013.01); *Y02T 10/92* (2013.01)

(58) Field of Classification Search
CPC .... H02P 27/06; H02P 29/0241; H02P 29/032; H02P 9/30; H02P 21/14; H02P 29/024; H02M 1/32; H02M 7/44; H02M 7/5387; H02M 5/45; B60L 11/1811; B60L 2210/40
USPC ............ 318/400.21, 400.22, 400.26, 400.27, 318/400.28, 400.31, 706
See application file for complete search history.

(56) References Cited

U.S. PATENT DOCUMENTS 7,141,947 B2 * 11/2006 Pispa ........................ B60L 7/06
318/375
8,159,847 B2 *  4/2012 Viitanen ................... H02P 3/22
363/37

(Continued)

FOREIGN PATENT DOCUMENTS

JP    2009-195026 A    8/2009

*Primary Examiner* — Bentsu Ro
*Assistant Examiner* — Thai Dinh
(74) *Attorney, Agent, or Firm* — Sughrue Mion, PLLC

(57) ABSTRACT

A control system includes an electronic control unit. The electronic control unit is configured to execute three-phase ON control such that two transistors connected in parallel to the first transistor are switched ON when a condition i) is satisfied, The first transistor is one of the transistor of the six transistors and in which the short-circuit fault has occurred. The condition i) is that a recovery loss of a first diode in which a reverse recovery current is generated is estimated to be smaller than a recovery tolerance.

5 Claims, 5 Drawing Sheets

(51) Int. Cl.
  *H02M 7/44* (2006.01)
  *H02P 29/024* (2016.01)
  *H02M 3/156* (2006.01)
  *H02M 7/5387* (2007.01)
  *B60L 3/00* (2006.01)
  *B60L 3/04* (2006.01)
  *B60L 11/18* (2006.01)
  *B60L 15/00* (2006.01)
  *H02P 29/032* (2016.01)
  *H02M 1/00* (2006.01)

(56) References Cited

U.S. PATENT DOCUMENTS

| | | | | |
|---|---|---|---|---|
| 8,299,737 | B2* | 10/2012 | Morita | H01L 29/7787 257/192 |
| 8,319,460 | B2* | 11/2012 | Son | H02P 6/20 318/254.1 |
| 8,907,611 | B2* | 12/2014 | Qin | H02P 27/08 318/400.02 |
| 2006/0267541 | A1* | 11/2006 | Battello | H02P 6/085 318/801 |
| 2009/0195199 | A1* | 8/2009 | Ito | B60L 3/003 318/400.22 |
| 2010/0036555 | A1* | 2/2010 | Hosoda | B60L 3/003 701/22 |
| 2010/0263953 | A1 | 10/2010 | Shimana | |
| 2010/0309700 | A1* | 12/2010 | Maeda | H02M 7/5387 363/126 |
| 2011/0215746 | A1* | 9/2011 | Ikoshi | H01L 24/06 318/400.27 |

* cited by examiner

US 9,866,107 B2

CONTROL SYSTEM FOR INVERTER

INCORPORATION BY REFERENCE

The disclosure of Japanese Patent Application No. 2015-034074, filed on Feb. 24, 2015 including the specification, drawings and abstract, is incorporated herein by reference in its entirety.

BACKGROUND OF THE INVENTION

1. Field of the Invention

The invention relates to a control system for an inverter, and more particularly to a control system for an inverter constituted by six transistors and six diodes.

2. Description of Related Art

An apparatus that executes three-phase ON control when a short-circuit fault occurs in an inverter so that a switching element in which the short-circuit fault has occurred and switching elements connected in parallel thereto are all switched ON has been proposed as a conventional control system for an inverter of this type (see Japanese Patent Application Publication No. 2009-195026, for example). In this apparatus, when the inverter is short-circuited and a rotation speed of a motor/generator that is driven by the inverter is at or below a predetermined reference rotation speed, limp-home travel control is performed after switching ON the switching element in which the short-circuit fault has occurred and a switching element connected in series thereto. When the rotation speed of the motor/generator exceeds the predetermined reference rotation speed, on the other hand, the three-phase ON control is executed. In so doing, limp-home travel is performed while preventing an overcurrent from passing through the inverter.

In the control system for an inverter described above, however, a diode connected in parallel to the switching element in an opposite direction thereto may break.

When a diode through which a forward direction current is passed receives a voltage in an opposite direction at the start of the three-phase ON control, a recovery current (a reverse recovery current) passes through the diode. When the reverse direction voltage is too high or the recovery current is too large at this time, recovery loss may occur in excess of a recovery tolerance, and as a result, the diode may break.

SUMMARY OF THE INVENTION

In a control system for an inverter according to the invention, breakage of a diode forming an inverter is suppressed when three-phase ON control is executed in response to a short-circuit fault in the inverter.

A control system related to the present invention is for an inverter. The inverter includes six transistors and six diodes. The control system includes an electronic control unit. The electronic control unit is configured to execute three-phase ON control such that two transistors connected in parallel to the first transistor are switched ON when a condition i) is satisfied; i) a recovery loss of a first diode that is one of the six diodes in which a reverse recovery current is generated is estimated to be smaller than a recovery tolerance. The first transistor being one of the transistor of the six transistors and in which the short-circuit fault has occurred.

As described above, the three-phase ON control is executed when the recovery loss of the first diode is estimated to be smaller than the recovery tolerance. Therefore breakage of the diode in which the reverse recovery current is generated can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is an illustrative view illustrating temporal variation in phase currents of a u phase, a v phase, and a w phase and a manner in which it is determined whether or not to be possible to shift to three-phase ON;

DETAILED DESCRIPTION OF EMBODIMENTS

Next, an embodiment of the invention will be described using examples.

Figure 1:
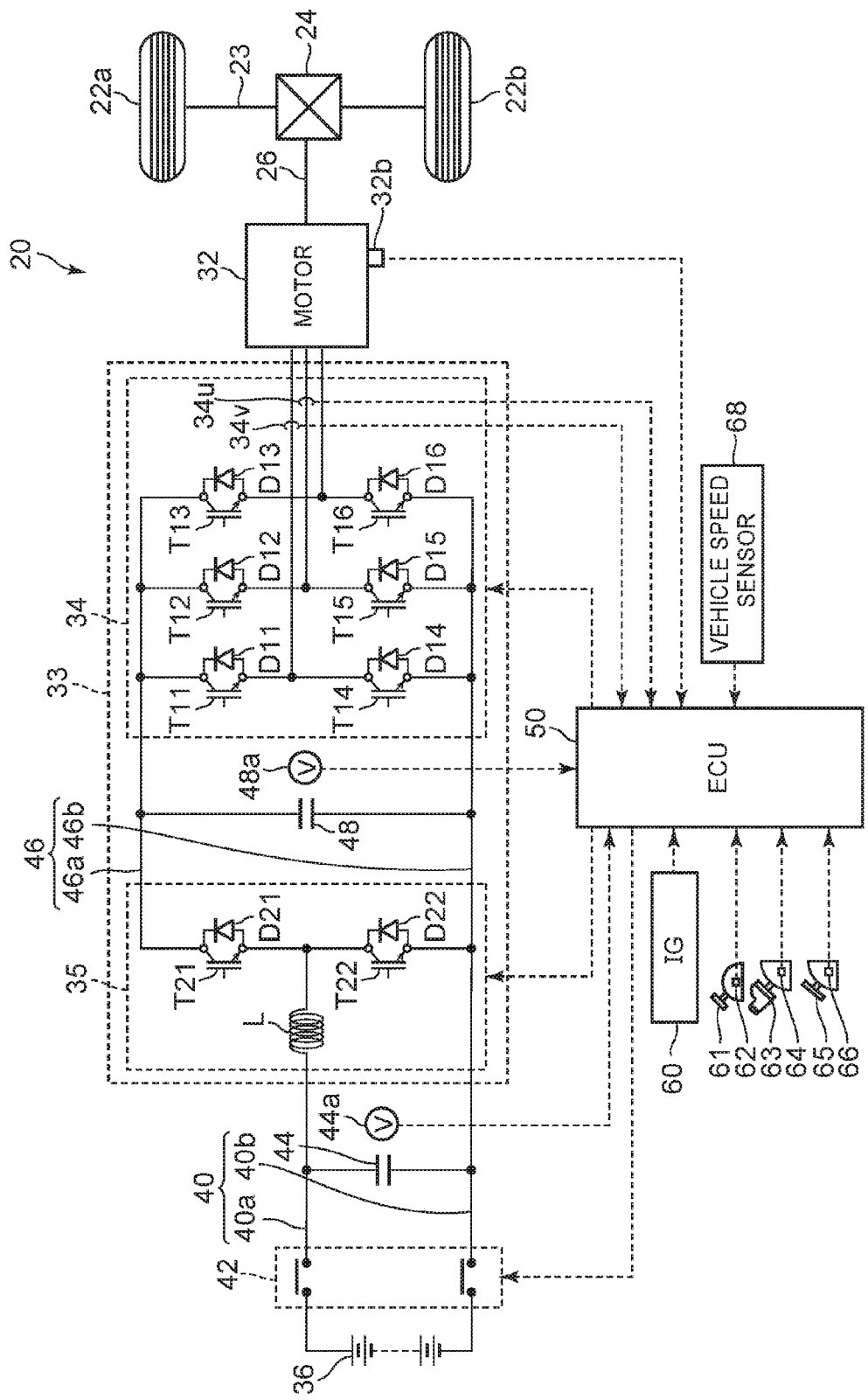
FIG. 1 is a schematic view showing a configuration of an electric vehicle 20 serving as an embodiment of the invention.

FIG. 1 is a schematic view showing a configuration of an electric vehicle 20 serving as an embodiment of the invention. As shown in the drawing, the electric vehicle 20 according to this embodiment includes a motor 32, a power control unit (referred to hereafter as a PCU) 33, a battery 36, a relay 42, and an electronic control unit (referred to hereafter as an ECU) 50.

The motor 32 is configured as a conventional synchronous generator/motor having a rotor in which a permanent magnet is embedded and a stator around which a three-phase coil is wound. The motor 32 is attached to a drive shaft 26, and the drive shaft 26 is coupled to drive wheels 22a, 22b via a drive shaft (an axle) 23 and a differential gear 24. As the motor 32 rotates, a counter electromotive voltage (also referred to as an induced voltage) Vm is generated thereby.

The PCU 33 includes an inverter 34, a boost converter 35, and a smoothing capacitor 48, all of which are housed in a single case. The inverter 34 includes six transistors T11 to T16 configured as insulated gate bipolar transistors (IGBTs), for example, and six diodes D11 to D16. The transistors T11 to T16 are disposed in pairs respectively constituted by a source side transistor and a sink side transistor relative to a positive electrode bus line 46a and a negative electrode bus line 46b of a high voltage system power line 46. The six diodes D11 to D16 are connected in parallel to the respective transistors T11 to T16 in an opposite direction to the transistors T11 to T16. Coils (a U phase coil, a V phase coil, and a W phase coil) forming a three-phase coil of the motor 32 are connected to respective connecting points between the transistor pairs formed from the transistors T11 to T16. Hence, by having the ECU 50 adjust ON time proportions of the pairs of transistors T11 to T16 while a voltage is applied to the inverter 34, a rotating magnetic field is formed in the three-phase coil, and as a result, the motor 32 is driven to rotate.

The boost converter 35 is connected to the high voltage system power line 46, to which inverters 41, 42 are connected, and to a low voltage system power line 40 to which the battery 36 is connected. The boost converter 35 includes two transistors T21, T22, two diodes D21, D22 connected in parallel to the respective transistors T21, T22 in an opposite direction to the transistors T21, T22, and a reactor L. The transistor T21 is connected to the positive electrode bus line 46a of the high voltage system power line 46. The transistor T22 is connected to the transistor T21, and connected to a negative electrode bus line 40b of the low voltage system power line 40, which doubles as the negative electrode bus line 46b of the high voltage system power line 46. The reactor L is connected to a connecting point between the transistors T21, T22, and to the positive electrode bus line 40a of the low voltage system power line 40. By having the ECU 50 switch the transistors T21, T22 ON and OFF, the boost converter 35 is caused to boost power on the low voltage system power line 40 and supply the boosted power to the high voltage system power line 46, and to step down power on the high voltage system power line 46 and supply the stepped-down power to the low voltage system power line 40.

The battery 36 is configured as a lithium ion secondary battery or a nickel hydrogen secondary battery, for example. A capacitor 44 is connected to the positive electrode bus line 40a and the negative electrode bus line 40b of the low voltage system power line 40. The relay 42 is provided on the battery 36 side of a connecting point by which the positive electrode bus line 40a and the negative electrode bus line 40b are connected to the capacitor 44. The relay 42 establishes and releases a connection between the PCU 33 side (the boost converter 35 and the inverter 34) and the battery 36 side.

The ECU 50, although not shown in the drawing, is configured as a microprocessor centering on a CPU and including, in addition to the CPU, a ROM that stores a processing program, a RAM that stores data temporarily, input/output ports, and a communication port. Signals from various sensors are input into the ECU 50 via the input port. The following may be cited as the signals from the various sensors: a rotation position θ m from rotation position detection sensor 32b that detects a rotation position of the rotor of the motor 32; phase currents Iu, Iv of the motor 32, obtained from current sensors 34u, 34v attached to the power lines to which the motor 32 and the inverter 34 are connected; a battery voltage Vb from a voltage sensor attached between terminals of the battery 36; a battery current Ib from a current sensor attached to an output terminal of the battery 36; a battery temperature Tb from a temperature sensor attached to the battery 36; a capacitor voltage (a low voltage system voltage) VB from a voltage sensor 44a attached between terminals of the capacitor 44; a capacitor voltage (a high voltage system voltage) VH from a voltage sensor 48a attached between terminals of the capacitor 48; an ignition signal from an ignition switch 60; a shift position SP from a shift position sensor 62 that detects an operating position of a shift lever 61; an accelerator depression amount Acc from an accelerator pedal position sensor 64 that detects a depression amount of an accelerator pedal 63; a brake pedal position BP from a brake pedal position sensor 66 that detects a depression amount of a brake pedal 65; and a vehicle speed V from a vehicle speed sensor 68. Various control signals are output from the ECU 50 via the output port. The following may be cited as the various control signals: switching control signals for switching the transistors T11 to T16 of the inverter 34; switching control signals for switching the transistors T21, T22 of the boost converter 35; and a control signal output to the relay 42. Note that the ECU 50 calculates a rotation speed Nm of the motor 32 on the basis of the rotation position θ m of the rotor of the motor 32, detected by the rotation position detection sensor 32b, and calculates a phase current Iw from the phase currents Iu, Iv of the motor 32, obtained from the current sensors 34u, 34v. Further, the ECU 50 calculates a storage ratio SOC of the battery 36 on the basis of an integrated value of the battery current Ib that is detected by the current sensor attached to the output terminal of the battery 36.

Figure 2:
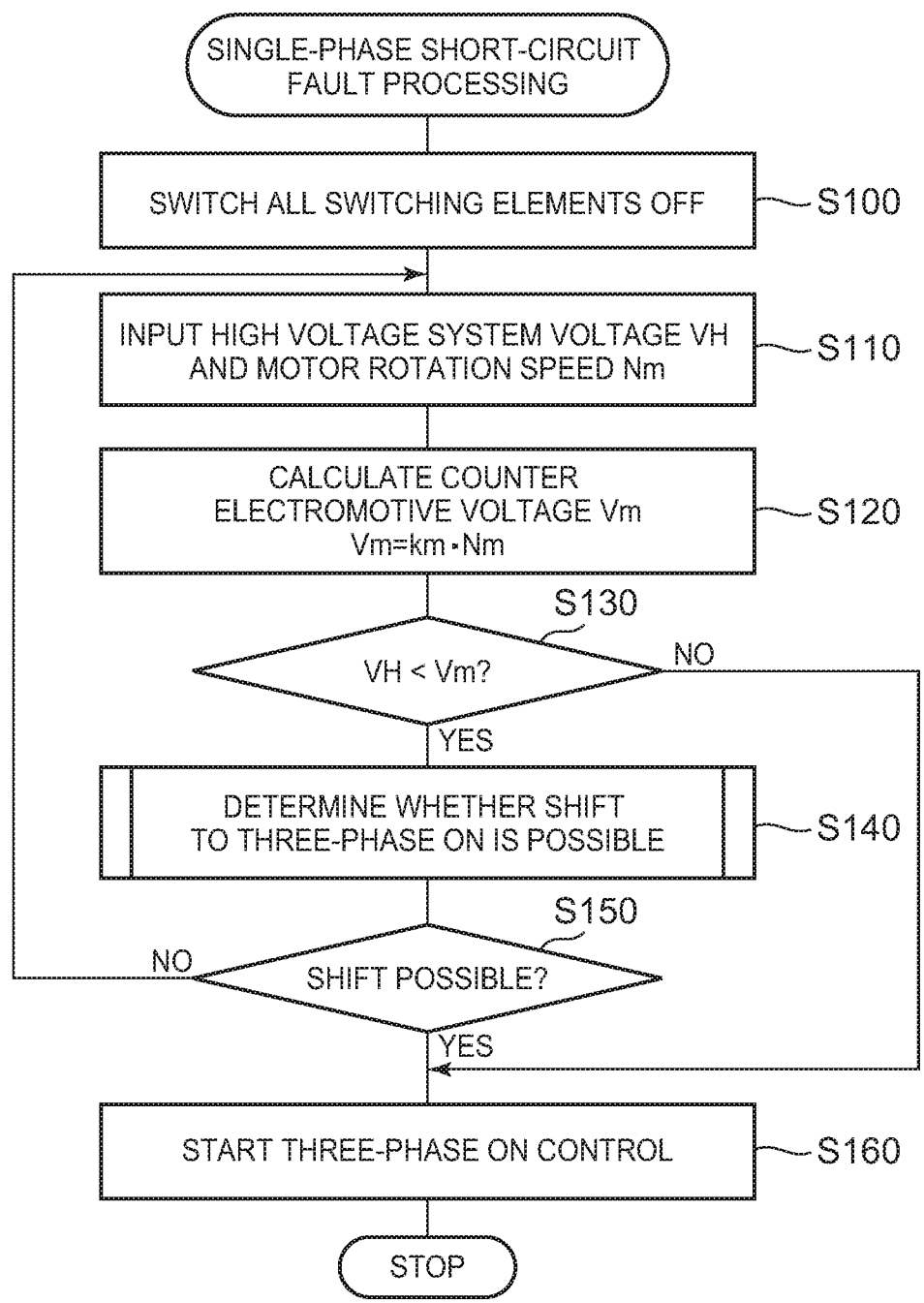
FIG. 2 is a flowchart showing an example of single-phase short-circuit fault processing executed by an ECU 50.

Next, an operation of the electric vehicle 20 according to this embodiment, configured as described above, and more specifically an operation performed when a short-circuit fault occurs in one of the six transistors T11 to T16 of the inverter 34, will be described. FIG. 2 is a flowchart showing an example of single-phase short-circuit fault processing executed by the ECU 50 when a short-circuit fault occurs in one of the six transistors T11 to T16 of the inverter 34.

When the single-phase short-circuit fault processing is executed, first, the ECU 50 switches all of the six transistors T11 to T16 of the inverter 34 OFF (step S100). Next, the high voltage system voltage VH from the voltage sensor 48a and the rotation speed Nm of the motor 32 are input (step S110). It is assumed here that the input rotation speed Nm of the motor 32 is calculated on the basis of the rotation position θ m detected by the rotation position detection sensor 32b. The counter electromotive voltage Vm is then calculated by multiplying the input rotation speed Nm of the motor 32 by a conversion factor km used to calculate the counter electromotive voltage (the induced voltage) (step S120), whereupon a determination is made as to whether or not the high voltage system voltage VH equals or exceeds the counter electromotive voltage Vm (step S130).

When it is determined in step S130 that the high voltage system voltage VH equals or exceeds the counter electromotive voltage Vm, three-phase ON control is started by switching the transistor in which the short-circuit fault has occurred and the two transistors connected in parallel thereto ON (step S160). The processing is then terminated. In an example of the three-phase ON control, when a short-circuit fault occurs in a transistor T14 of a lower arm, for example, the two lower arm transistors T15, T16 connected in parallel to the transistor T14 are switched ON, and when a short-circuit fault occurs in a transistor T12 of an upper arm, for example, the two upper arm transistors T11, T13 connected in parallel to the transistor T12 are switched ON.

When it is determined in step S130 that the high voltage system voltage VH is lower than the counter electromotive voltage Vm, a determination is made as to whether or not it is possible to shift to the three-phase ON control (steps S140, S150). When it is determined to be possible to shift to the three-phase ON control, the three-phase ON control is started by switching the transistor in which the short-circuit fault has occurred and the two transistors connected in parallel thereto ON (step S160), whereupon the processing is terminated. In the determination as to whether or not it is possible to shift to the three-phase ON control, a shift is determined to be possible when a recovery loss of a diode in which a reverse recovery current is generated at the start of the three-phase ON control, among the six diodes D11 to D16 of the inverter 34, is estimated to be smaller than a recovery tolerance. When the recovery loss is not estimated to be smaller than the recovery tolerance, on the other hand, a shift is determined to be impossible. Here, the "recovery loss" is a product of the reverse recovery current generated in a diode through which a forward direction current is passed when a reverse direction voltage acts on the diode, and the reverse direction voltage acting on the diode, and is also referred to as reverse recovery loss. The "recovery tolerance" is set in advance at a slightly smaller value than an upper limit value of the recovery loss (the reverse recovery loss) at which the diode does not break.

Figure 3:
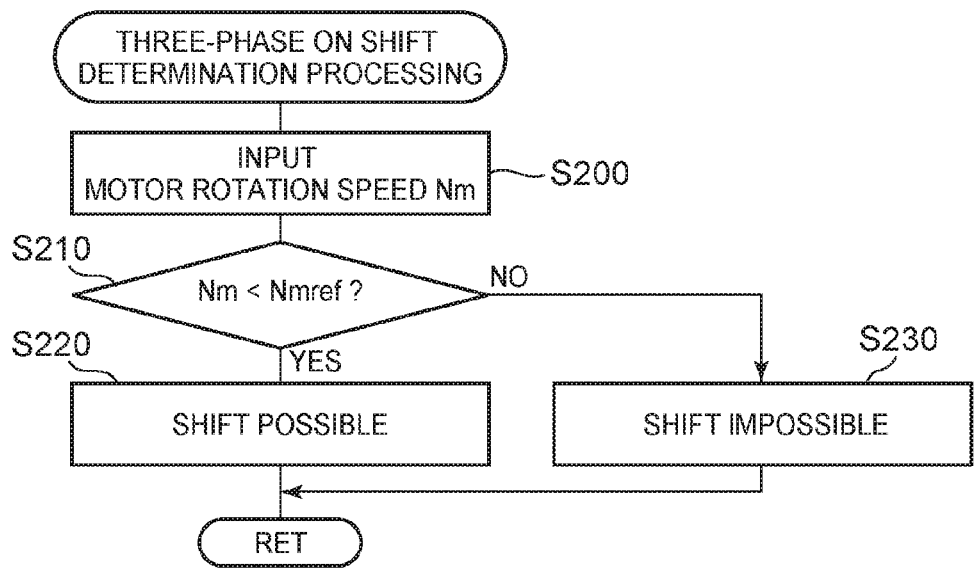
FIG. 3 is a flowchart showing an example of three-phase ON shift determination processing executed by the ECU 50.

In this embodiment, the determination as to whether or not it is possible to shift to the three-phase ON control is made by executing three-phase ON shift determination processing, an example of which is shown in FIG. 3. In the three-phase ON shift determination processing, the rotation speed Nm of the motor 32 is input (step S200), and a determination is made as to whether or not the input rotation speed Nm is lower than a predetermined rotation speed threshold Nmref (step S210). When the rotation speed Nm is lower than the predetermined rotation speed threshold Nmref, it is determined to be possible to shift to three-phase ON (step S220), and when the rotation speed Nm equals or exceeds the predetermined rotation speed Nmref, it is determined to be impossible to shift to three-phase ON (step S230). By multiplying the rotation speed Nm of the motor 32 by the conversion factor km, the counter electromotive voltage Vm generated by the motor 32 is obtained, and therefore the rotation speed Nm of the motor 32 has a linear correlative relationship with the counter electromotive voltage Vm. In the single-phase short-circuit fault processing of FIG. 2, the determination as to whether or not it is possible to shift to the three-phase ON control is made when the high voltage system voltage VH is lower than the counter electromotive voltage Vm, and therefore the reverse direction voltage acting on the diode in which the reverse recovery current is generated corresponds to the counter electromotive voltage Vm of the motor 32. The recovery loss is the product of the reverse recovery current and the reverse direction voltage, and therefore, when the reverse direction voltage is small, the recovery loss is also small. Here, a voltage at which the recovery loss can be estimated to reach the recovery tolerance is determined by calculations, experiments, and so on and set as a predetermined voltage, and a rotation speed generated by the motor 32 when the counter electromotive voltage equals the predetermined voltage is set as the predetermined rotation speed Nmref. Accordingly, when the rotation speed Nm of the motor 32 is lower than the predetermined rotation speed Nmref, the counter electromotive voltage Vm of the motor 32 is smaller than the predetermined voltage, and therefore the recovery loss can be estimated to be smaller than the recovery tolerance. In this embodiment, when the rotation speed Nm of the motor 32 is lower than the predetermined rotation speed Nmref on the basis of this reasoning, the recovery loss is estimated to be smaller than the recovery tolerance, and it is therefore determined to be possible to shift to three-phase ON. When the rotation speed Nm of the motor 32 equals or exceeds the predetermined rotation speed Nmref, on the other hand, the recovery loss cannot be estimated to be smaller than the recovery tolerance, and it is therefore determined to be impossible to shift to three-phase ON.

Meanwhile, when it is determined to be impossible to shift to three-phase ON in the determination of steps S140 and S150 as to whether or not it is possible to shift to the three-phase ON control, the routine returns to the processing for inputting the high voltage system voltage VH and the rotation speed Nm of the motor 32 in step S110. Hence, as long as the high voltage system voltage VH remains smaller than the counter electromotive voltage Vm, the processing of step S110 to S150 is repeated until it is determined to be possible to shift to the three-phase ON control in the three-phase ON shift determination processing shown in FIG. 3. When, during this repeated processing, it is determined to be possible to shift to the three-phase ON control in steps S140 and S150 or the high voltage system voltage VH is determined to equal or exceed the counter electromotive voltage Vm in step S130, the repeated processing is terminated and the three-phase ON control is started (step S160). The processing is then terminated.

In the electric vehicle 20 according to this embodiment, as described above, when a short-circuit fault occurs in one of the six transistors T11 to T16 of the inverter 34, a determination is made as to whether or not the high voltage system voltage VH is smaller than the counter electromotive voltage Vm generated by the motor 32. When the high voltage system voltage VH is determined to be smaller than the counter electromotive voltage Vm generated by the motor 32, the three-phase ON control is started after waiting until the recovery loss of the diode in which the reverse recovery current is generated at the start of the three-phase ON control is estimated to be smaller than the recovery tolerance. In so doing, a situation in which the recovery loss of the diode in which the reverse recovery current is generated at the start of the three-phase ON control exceeds the recovery tolerance such that the diode breaks can be prevented from occurring. Moreover, the determination as to whether or not it is possible to shift to three-phase ON, or in other words the determination as to whether or not the recovery loss can be estimated to be smaller than the recovery tolerance, is made by determining whether or not the rotation speed Nm of the motor 32 is lower than the predetermined rotation speed Nmref, and therefore breakage of the diode can be suppressed by performing a simple determination.

In the electric vehicle 20 according to this embodiment, the determination as to whether it is possible to shift to three-phase ON is made by determining whether or not the rotation speed Nm of the motor 32 is lower than the predetermined rotation speed Nmref. Instead, however, the determination as to whether it is possible to shift to three-phase ON may be made by determining whether or not the vehicle speed V is lower than a predetermined vehicle speed Vref. The vehicle speed V is obtained by multiplying the rotation speed Nm of the motor 32 by a conversion factor kv, and therefore the vehicle speed V can be used in a similar manner to the rotation speed Nm of the motor 32. In this case, the predetermined vehicle speed Vref may be calculated by multiplying the conversion factor kv by the predetermined rotation speed Nmref. Alternatively, the determination as to whether it is possible to shift to three-phase ON may be made by determining whether or not the counter electromotive voltage Vm generated by the motor 32 is smaller than a predetermined voltage Vset. The counter electromotive voltage Vm generated by the motor 32 is obtained by multiplying the rotation speed Nm of the motor 32 by the conversion factor km, and therefore the counter electromotive voltage Vm can be used in a similar manner to the rotation speed Nm of the motor 32. In this case, the predetermined voltage Vset may be calculated by multiplying the conversion factor km by the predetermined rotation speed Nmref. Furthermore, the determination as to whether it is possible to shift to three-phase ON may be made by attaching a voltage sensor to the positive electrode bus line 46a and the negative electrode bus line 46b of the high voltage system power line 46, and determining whether or not a voltage detected by this voltage sensor is smaller than a predetermined voltage. The voltage detected by this voltage sensor corresponds to the counter electromotive voltage Vm of the motor 32, and therefore the voltage detected by the voltage sensor can be used in a similar manner to the counter electromotive voltage Vm.

Figure 4:
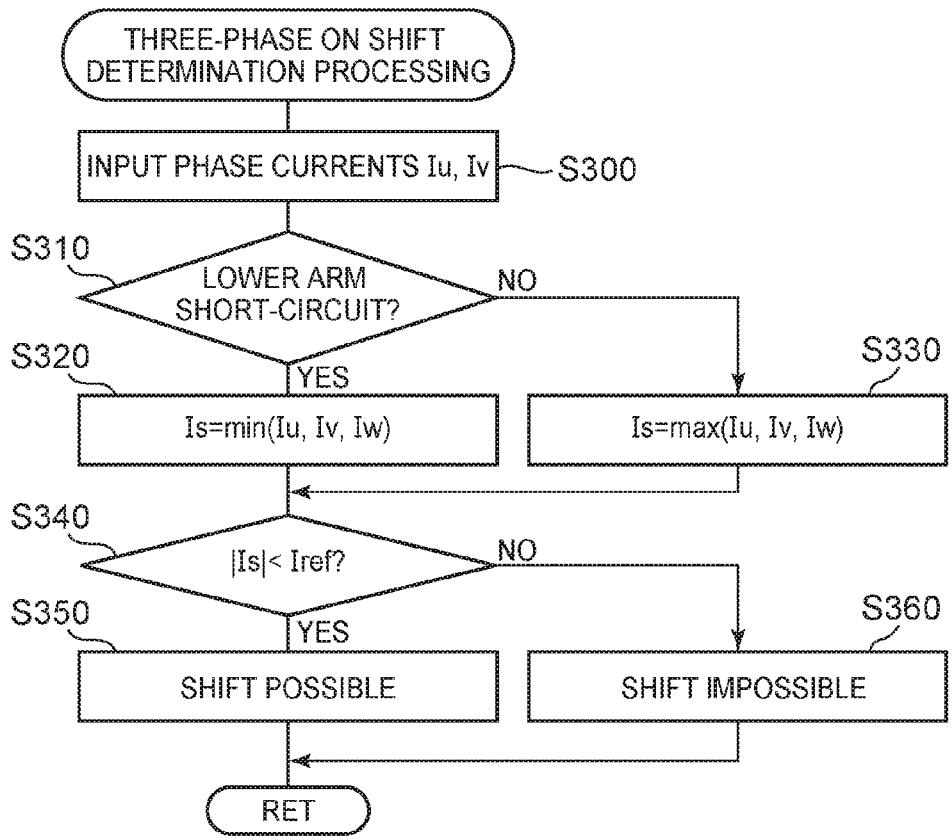
FIG. 4 is a flowchart showing a modified example of the three-phase ON shift determination processing executed by the ECU 50.

In the electric vehicle 20 according to this embodiment, the determination as to whether it is possible to shift to three-phase ON is made by determining whether or not the rotation speed Nm of the motor 32 is lower than the predetermined rotation speed Nmref. Instead, however, the determination as to whether it is possible to shift to three-phase ON may be made on the basis of the phase currents Iu, Iv, Iw. FIG. 4 is a flowchart showing an example of the three-phase ON shift determination processing executed by the ECU 50 in a case where the determination as to whether it is possible to shift to three-phase ON is made on the basis of the phase currents Iu, Iv, Iw.

When the three-phase ON shift determination processing shown in FIG. 4 is executed, first, the ECU 50 receives the phase currents Iu, Iv of the motor 32 from the current sensors 34u, 34v (step S300). The phase current Iw can be calculated easily on the basis of the phase currents Iu, Iv using an equation (Iu+Iv+Iw=0). A determination is then made as to whether the transistor in which the short-circuit fault has occurred is on the upper arm or the lower arm (step S310). When the transistor in which the short-circuit fault has occurred is determined to be on the lower arm, the smallest of the phase currents Iu, Iv, Iw (i.e. the phase current having the largest negative value) is set as a current value Is (step S320), and when the transistor in which the short-circuit fault has occurred is determined to be on the upper arm, the largest of the phase currents Iu, Iv, Iw (i.e. the phase current having the largest positive value) is set as the current value Is (step S330). When the transistor in which the short-circuit fault has occurred is on the lower arm, the diode in which the reverse recovery current is generated at the start of the three-phase ON control, in which the transistors T14 to T16 on the lower arm are switched ON, is an upper arm diode, and therefore a phase current generated when a forward direction current is passed through the upper arm diode takes a negative value. Hence, by setting the smallest of the phase currents Iu, Iv, Iw (i.e. the phase current having the largest negative value) as the current value Is, the current value Is is set at the value of the forward direction current passing through the diode in which the largest reverse recovery current is generated. Conversely, when the transistor in which the short-circuit fault has occurred is on the upper arm, the diode in which the reverse recovery current is generated at the start of the three-phase ON control, in which the transistors T11 to T13 on the upper arm are switched ON, is a lower arm diode, and therefore a phase current generated when a forward direction current is passed through the lower arm diode takes a positive value. Hence, by setting the largest of the phase currents Iu, Iv, Iw (i.e. the phase current having the largest positive value) as the current value Is, the current value Is is set at the value of the forward direction current passing through the diode in which the largest reverse recovery current is generated.

A determination is then made as to whether or not an absolute value of the set current value Is is smaller than a predetermined current value Iref (step S340). When the absolute value of the current value Is is smaller than the predetermined current value Iref, it is determined to be possible to shift to three-phase ON (step S350), and when the absolute value of the current value Is equals or exceeds the predetermined current value Iref, it is determined to be impossible to shift to three-phase ON (step S360). The recovery loss (the reverse recovery loss) is the product of the reverse recovery current and the reverse direction voltage, and therefore, when the reverse direction current is small, the recovery loss is also small. The reverse recovery current may be considered to increase when the value of the forward direction current passing through the diode is large, and therefore, by determining a current value at which the recovery loss can be estimated to reach the recovery tolerance by experiments and the like and setting this current value as the predetermined current value Iref, the recovery loss can be estimated to be smaller than the recovery tolerance when the absolute value of the current value Is is smaller than the predetermined current value Tref.

Figure 5:
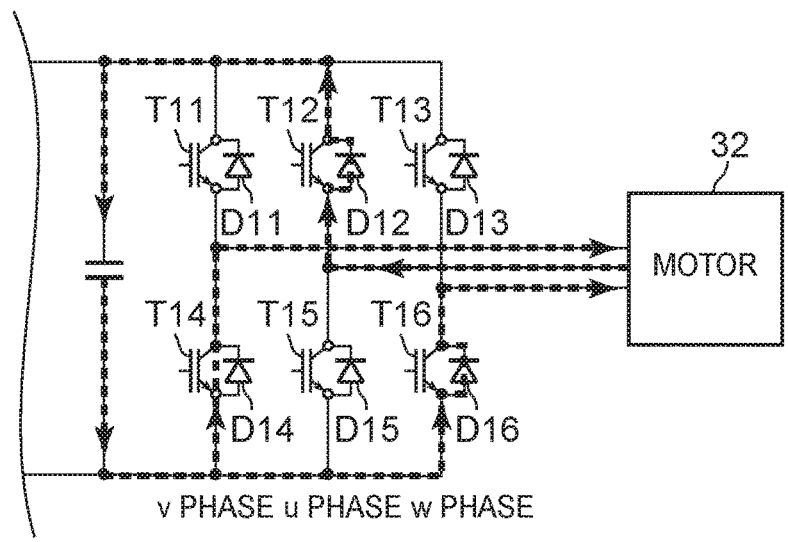
FIG. 5 is an illustrative view illustrating a condition in which a maximum forward direction current passes through a u phase diode D12 when a short-circuit fault occurs in a transistor T14 of an inverter 34.
Figure 6:
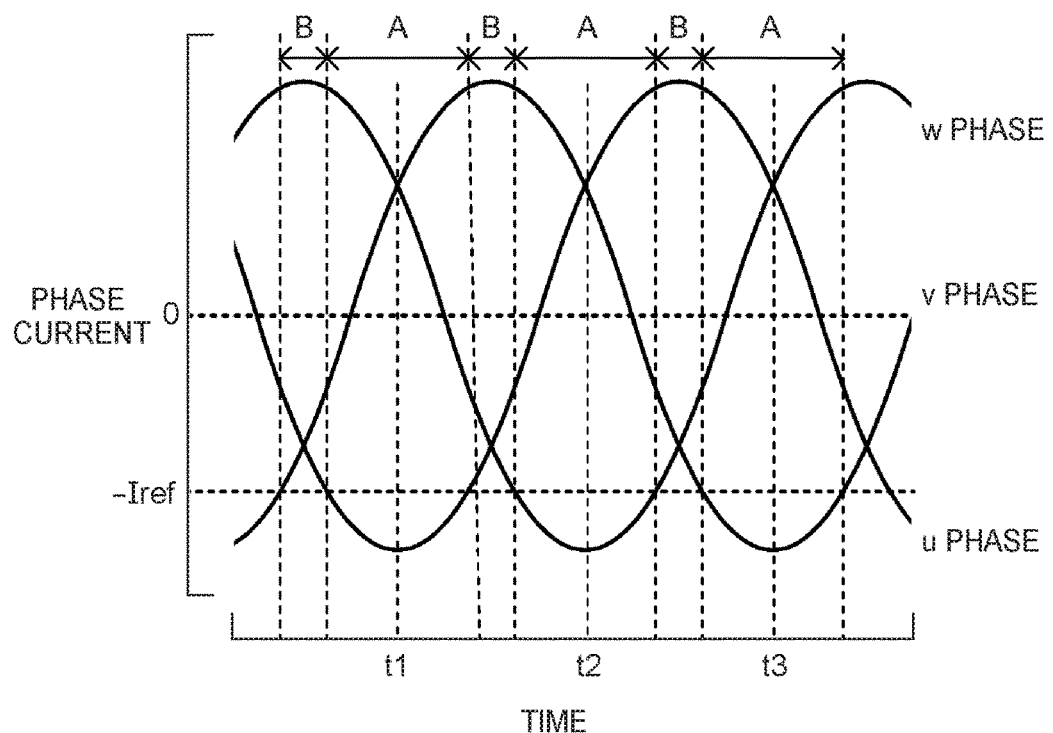

FIG. 5 is an illustrative view illustrating a condition in which a maximum forward direction current is passed through the u phase diode D12 when a short-circuit fault occurs in the transistor T14 of the inverter 34. FIG. 6 is an illustrative view illustrating temporal variation in the phase currents of the u phase, the v phase, and the w phase, and the manner in which it is determined whether or not to be possible to shift to three-phase ON. Note that the condition shown in FIG. 5 corresponds to a condition established at a time t1 in FIG. 6. As described above, when a short-circuit fault occurs in the lower arm transistor T14 of the inverter 34, the transistors T15, T16 connected in parallel to the transistor T14 are switched ON during the three-phase ON control, and therefore a reverse recovery current may be generated in the upper arm diodes D11 to D13 at the start of the three-phase ON control. Among timings at which the three-phase ON control is started, timings at which the largest reverse recovery currents are generated in the u phase, v phase, and w phase diodes D11 to D13 are set respectively as times t1, t3, t2. Absolute values of the forward direction currents passing respectively through the u phase, v phase, and w phase diodes D11 to D13 are smaller than the predetermined current value Iref in a region B shown in an upper portion of FIG. 6. Hence, when the three-phase ON control is started at a timing within the region B, the absolute value of the current value Is is smaller than the predetermined current value Iref, and therefore the recovery loss can be estimated to be smaller than the recovery tolerance. When the three-phase ON control is started at a timing within a region A, on the other hand, the absolute value of the current value Is equals or exceeds the predetermined current value Iref, and therefore the recovery loss cannot be estimated to be smaller than the recovery tolerance.

A similar effect to that of the embodiment is obtained likewise when the three-phase ON shift determination processing is executed in accordance with the modified example shown in FIG. 4. In other words, a situation in which the recovery loss of the diode in which the reverse recovery current is generated at the start of the three-phase ON control exceeds the recovery tolerance such that the diode breaks can be prevented from occurring.

In the three-phase ON shift determination processing according to this modified example, the determination as to whether or not it is possible to shift to three-phase ON is made using the phase currents Iu, Iv of the motor 32, obtained from the current sensors 34u, 34v. However, it is sufficient to be able to estimate momentary phase currents Iu, Iv, Iw, and therefore the determination as to whether or not it is possible to shift to three-phase ON may be made on the basis of a signal from the rotation position detection sensor 32*b* (a resolver, for example) that detects the rotation position of the rotor of the motor 32 instead of the current sensors 34*u*, 34*v*.

Figure 7:
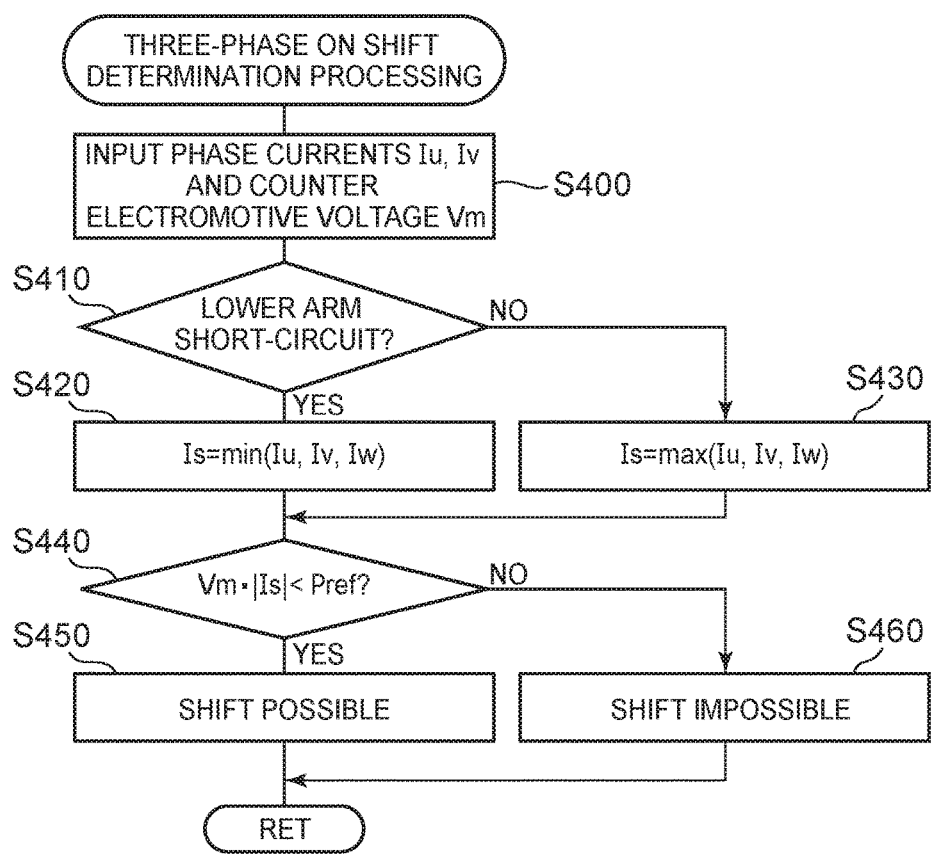
FIG. 7 is a flowchart showing a modified example of the three-phase ON shift determination processing executed by the ECU 50.

The determination as to whether or not it is possible to shift to three-phase ON may also be made on the basis of the phase currents Iu, Iv, Iw and the counter electromotive voltage Vm generated by the motor 32. FIG. 7 is a flowchart showing an example of the three-phase ON shift determination processing executed by the ECU 50 in a case where the determination as to whether or not it is possible to shift to three-phase ON is made on the basis of the phase currents Iu, Iv, Iw and the counter electromotive voltage Vm generated by the motor 32.

When the three-phase ON shift determination processing shown in FIG. 7 is executed, first, the ECU 50 receives the phase currents Iu, Iv of the motor 32 from the current sensors 34*u*, 34*v* and the counter electromotive voltage Vm generated by the motor 32 (step S400). The phase current Iw can be calculated easily on the basis of the phase currents Iu, Iv using the equation (Iu+Iv+Iw=0). A determination is then made as to whether the transistor in which the short-circuit fault has occurred is on the upper arm or the lower arm (step S410). When the transistor in which the short-circuit fault has occurred is determined to be on the lower arm, the smallest of the phase currents Iu, Iv, Iw (i.e. the phase current having the largest negative value) is set as the current value Is (step S420), and when the transistor in which the short-circuit fault has occurred is determined to be on the upper arm, the largest of the phase currents Iu, Iv, Iw (i.e. the phase current having the largest positive value) is set as the current value Is (step S430). The current value Is is defined as described above. A determination is then made as to whether or not a product of the counter electromotive voltage Vm generated by the motor 32 and the absolute value of the current value Is is smaller than a predetermined value Pref (step S440). When the product of the counter electromotive voltage Vm and the absolute value of the current value Is is smaller than the predetermined value Pref, it is determined to be possible to shift to three-phase ON (step S450), and when the product of the counter electromotive voltage Vm and the absolute value of the current value Is equals or exceeds the predetermined value Pref, it is determined to be impossible to shift to three-phase ON (step S460). The reverse recovery current may be considered to increase when the value of the forward direction current passing through the diode is large, and therefore, since the recovery loss (the reverse recovery loss) is the product of the reverse recovery current and the reverse direction voltage (the counter electromotive voltage Vm), the recovery loss (the reverse recovery loss) increases steadily as the product of the counter electromotive voltage Vm and the absolute value of the current value Is increases. Hence, by determining a product of the reverse direction voltage and the forward direction current value at which the recovery loss can be estimated to reach the recovery tolerance by experiments and the like and setting this product as the predetermined value Pref, the recovery loss can be estimated to be smaller than the recovery tolerance when the product of the counter electromotive voltage Vm and the absolute value of the current value Is is smaller than the predetermined value Pref. A similar effect to that of the embodiment is obtained likewise when the three-phase ON shift determination processing is executed in accordance with the modified example shown in FIG. 7. In other words, a situation in which the recovery loss of the diode in which the reverse recovery current is generated at the start of the three-phase ON control exceeds the recovery tolerance such that the diode breaks can be prevented from occurring.

The electric vehicle 20 according to this embodiment includes the boost converter 35, but the boost converter 35 may be omitted. Further, the electric vehicle 20 according to this embodiment includes the travel motor 32, but may include two or more travel motors. Furthermore, in the embodiment, the invention is applied to an electric vehicle, but the invention may be applied to a hybrid vehicle having an engine and a motor.

In the embodiment, the inverter 34 is an example of an "inverter", and the ECU 50 is an example of an "electronic control unit".

The correspondence relationships of the main elements of the invention are specific examples illustrating an implementation of the invention described in the embodiment, and the elements of the invention are not limited thereto. In other words, the embodiment is merely a specific example of the invention.

The invention was described above using embodiment thereof, but the invention is not limited in any way to this embodiment, and may of course be implemented in various embodiments within a scope that does not depart from the spirit of the invention.

The invention may be used in the inverter control apparatus manufacturing industry and so on.

A control system for an inverter according to the invention serves as a control apparatus for an inverter that is constituted by six transistors and six diodes. In this control system, in a case where three-phase ON control is executed in response to a short-circuit fault in any one of the six transistors such that the transistor in which the short-circuit fault has occurred and two transistors connected in parallel thereto are switched ON, the three-phase ON control is started when a recovery loss of a diode in which a reverse recovery current is generated, among the six diodes, is estimated to be smaller than a recovery tolerance.

In the control system for an inverter according to the invention, in a case where three-phase ON control is executed in response to a short-circuit fault in any one of the six transistors constituting the inverter such that the transistor in which the short-circuit fault has occurred and the two transistors connected in parallel thereto are switched ON, the three-phase ON control is started when the recovery loss of the diode in which the reverse recovery current is generated, among the six diodes, is estimated to be smaller than the recovery tolerance. Here, the "recovery loss" is a product of the reverse recovery current generated in a diode through which a forward direction current is passed when a reverse direction voltage acts on the diode, and the reverse direction voltage acting on the diode, and is also referred to as reverse recovery loss. The "recovery tolerance" is set in advance at a slightly smaller value than an upper limit value of the recovery loss (the reverse recovery loss) at which the diode does not break. As described above, the three-phase ON control is started when the recovery loss of the diode in which the reverse recovery current is generated is estimated to be smaller than the recovery tolerance, and therefore breakage of the diode in which the reverse recovery current is generated can be suppressed.

In the control system for an inverter according to the invention, the three-phase ON control may be started by estimating the recovery loss to be smaller than the recovery tolerance when a reverse direction voltage acting on the diode in which the reverse recovery current is generated is smaller than a predetermined voltage. Here, the reverse direction voltage can be detected using a voltage sensor or the like. As described above, the recovery loss (the reverse recovery loss) is the product of the reverse recovery current and the reverse direction voltage, and therefore, when the reverse direction voltage is small, the recovery loss (the reverse recovery loss) is also small. Hence, by setting the predetermined voltage appropriately, the recovery loss can be estimated to be smaller than the recovery tolerance when the reverse direction voltage is smaller than the predetermined voltage.

Further, in the control system for an inverter according to the invention, the three-phase ON control may be started by estimating the recovery loss to be smaller than the recovery tolerance when a rotation speed of a rotating electric machine driven by the inverter is lower than a predetermined rotation speed. When the rotating electric machine rotates, an induced voltage (a counter electromotive voltage) is generated thereby, and this voltage corresponds to the rotation speed. Meanwhile, the three-phase ON control is normally executed when the counter electromotive voltage of the rotating electric machine is large, and therefore the reverse direction voltage acting on the diode is often equal to the counter electromotive voltage of the rotating electric machine. Hence, by using a rotation speed of the rotating electric machine at which the counter electromotive voltage of the rotating electric machine reaches the aforesaid predetermined voltage as the predetermined rotation speed, the reverse direction voltage serving as the counter electromotive voltage can be kept below the predetermined voltage. Therefore, by setting the predetermined rotation speed and the predetermined voltage appropriately, the recovery loss can be estimated to be smaller than the recovery tolerance when the rotation speed of the rotating electric machine is lower than the predetermined rotation speed. Note that in a vehicle in which a rotating electric machine driven by the inverter is install as a travel motor, the three-phase ON control may be started by estimating the recovery loss to be smaller than the recovery tolerance when a vehicle speed is lower than a predetermined vehicle speed. In this case, the rotation speed of the rotating electric machine is obtained by multiplying the vehicle speed by a conversion factor, and therefore, by setting a vehicle speed at which the rotation speed of the rotating electric machine reaches the predetermined rotation speed as the predetermined vehicle speed, the rotation speed of the rotating electric machine can be determined to be lower than the predetermined rotation speed, and accordingly, as described above, the recovery loss can be estimated to be smaller than the recovery tolerance, when the vehicle speed is lower than the predetermined vehicle speed.

Furthermore, in the control system for an inverter according to the invention, the three-phase ON control may be started by estimating the recovery loss to be smaller than the recovery tolerance when a value of a forward direction current passing through the diode in which the reverse recovery current is generated is smaller than a predetermined current value. Here, a determination as to whether or not the value of the forward direction current is smaller than the predetermined current can be made using a detected value from a current sensor or a signal from a resolver that detects the rotation speed of the rotating electric machine. As described above, the recovery loss (the reverse recovery loss) is the product of the reverse recovery current and the reverse direction voltage, and therefore, when the reverse recovery current is small, the recovery loss (the reverse recovery loss) is also small. The reverse recovery current may be considered to increase when the value of the forward direction current passing through the diode is large, and therefore, by setting the predetermined current value appropriately, the recovery loss can be estimated to be smaller than the recovery tolerance when the value of the forward direction current is smaller than the predetermined current value.

Alternatively, in the control system for an inverter according to the invention, the three-phase ON control may be started by estimating the recovery loss to be smaller than the recovery tolerance when a product of a value of a forward direction current passing through the diode in which the reverse recovery current is generated and a reverse direction voltage acting on the diode is smaller than a predetermined value. Here, the value of the forward direction current can be detected using a current sensor. Further, the reverse direction voltage can be detected using a voltage sensor or the like, or can be estimated from the rotation speed of the rotating electric machine driven by the inverter, the vehicle speed, and so on. As described above, the reverse recovery current may be considered to increase when the value of the forward direction current passing through the diode is large, and therefore the recovery loss may be considered to increase steadily as the product of the value of the forward direction current passing through the diode and the reverse direction voltage increases. Hence, by setting the predetermined value appropriately, the recovery loss can be estimated to be smaller than the recovery tolerance when the product of the value of the forward direction current and the reverse direction voltage is smaller than the predetermined value.

What is claimed is:

1. A control system for an inverter, the inverter including six transistors and six diodes, the control system comprising:
an electronic control unit configured to execute three-phase ON control such that two transistors connected in parallel to a first transistor are switched ON when a condition i) is satisfied, the first transistor being one of the six transistors and in which the short-circuit fault has occurred,
i) a recovery loss of a first diode that is one of the six diodes in which a reverse recovery current is generated is estimated to be smaller than a recovery tolerance.

2. The control system according to claim 1, wherein the recovery loss is estimated to be smaller than the recovery tolerance when a reverse direction voltage acting on the first diode is smaller than a predetermined voltage.

3. The control system according to claim 1, wherein the recovery loss is estimated to be smaller than the recovery tolerance when a rotation speed of a rotating electric machine driven by the inverter is lower than a predetermined rotation speed.

4. The control system according to claim 1, wherein the recovery loss is estimated to be smaller than the recovery tolerance when a value of a forward direction current passing through the first diode is smaller than a predetermined current value.

5. The control system according to claim 1, wherein the recovery loss is estimated to be smaller than the recovery tolerance when a product of a value of a forward direction current passing through the first diode and a reverse direction voltage acting on the first diode is smaller than a predetermined value.

* * * * *